(12) United States Patent
Choi et al.

(10) Patent No.: US 11,234,103 B2
(45) Date of Patent: Jan. 25, 2022

(54) ELECTRONIC DEVICE AND METHOD FOR PROVIDING IDENTIFICATION INFORMATION

(71) Applicant: SAMSUNG ELECTRONICS CO., LTD., Suwon-si (KR)

(72) Inventors: Jong-Ho Choi, Suwon-si (KR); Ung-Yeop Choi, Seoul (KR); Hye-Min Choi, Yongin-si (KR); Tae-Gun Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 16/088,156

(22) PCT Filed: Mar. 23, 2017

(86) PCT No.: PCT/KR2017/003139
§ 371 (c)(1),
(2) Date: Sep. 25, 2018

(87) PCT Pub. No.: WO2017/164671
PCT Pub. Date: Sep. 28, 2017

(65) Prior Publication Data
US 2020/0304950 A1 Sep. 24, 2020

(30) Foreign Application Priority Data
Mar. 25, 2016 (KR) .................. 10-2016-0036251

(51) Int. Cl.
*H04W 4/029* (2018.01)
*H04W 64/00* (2009.01)
*H04W 4/20* (2018.01)

(52) U.S. Cl.
CPC ............ *H04W 4/029* (2018.02); *H04W 4/20* (2013.01); *H04W 64/006* (2013.01)

(58) Field of Classification Search
CPC ... H04W 4/00–06; H04W 4/185; H04W 4/23; H04W 4/30–38; H04W 4/50–80; H04W 76/00–25
See application file for complete search history.

(56) References Cited

U.S. PATENT DOCUMENTS

| | | | |
|---|---|---|---|
| 9,338,747 B1 * | 5/2016 | Parthasaralhy ....... | H04W 28/12 |
| 2007/0281712 A1 * | 12/2007 | Povey ................. | H04W 64/00 |
| | | | 455/456.1 |

(Continued)

FOREIGN PATENT DOCUMENTS

| KR | 10-2014-0090001 | 7/2014 |
|---|---|---|
| KR | 10-2015-0135895 | 12/2015 |

(Continued)

OTHER PUBLICATIONS

Extended Search Report dated Jan. 4, 2019 in counterpart European Patent Application No. 17770641.3.

(Continued)

*Primary Examiner* — San Htun
(74) *Attorney, Agent, or Firm* — Nixon & Vanderhye, P.C.

(57) ABSTRACT

The present invention relates to an electronic device, and to an electronic device and a method for providing service information. To this end, the electronic device of the present invention comprises a first communication module, a second communication module, a memory for storing location information of the electronic device, and a processor, wherein the processor can be configured to: acquire, from a first external electronic device located at a near distance from the electronic device, identification information corresponding to the place here the first external electronic device is located, by using the first communication module; transmit, to a second external electronic device, the identification information and the location information, by using the (Continued)

second communication module; and receive, from the second external electronic device, service information corresponding to the identification information, by using the second communication module.

13 Claims, 9 Drawing Sheets

(56) References Cited

U.S. PATENT DOCUMENTS

| | | | | |
|---|---|---|---|---|
| 2009/0319175 | A1* | 12/2009 | Khosravy | G01C 21/20 |
| | | | | 701/467 |
| 2013/0029686 | A1* | 1/2013 | Moshfeghi | H04W 4/02 |
| | | | | 455/456.1 |
| 2013/0115916 | A1 | 5/2013 | Herz | |
| 2013/0308470 | A1* | 11/2013 | Bevan | H04W 36/32 |
| | | | | 370/252 |
| 2015/0339861 | A1 | 11/2015 | Yun et al. | |
| 2015/0351070 | A1 | 12/2015 | Lee et al. | |
| 2015/0358778 | A1 | 12/2015 | Heo et al. | |
| 2016/0066123 | A1* | 3/2016 | Ko | H04W 4/70 |
| | | | | 455/41.1 |
| 2016/0203522 | A1* | 7/2016 | Shiffert | G06Q 30/0267 |
| | | | | 705/14.58 |
| 2016/0330779 | A1* | 11/2016 | Neumann | H04W 4/026 |
| 2017/0285722 | A1 | 10/2017 | Kim | |

FOREIGN PATENT DOCUMENTS

| | | |
|---|---|---|
| KR | 10-2015-0140021 | 12/2015 |
| KR | 10-2016-0028146 | 3/2016 |
| WO | 2016/032022 | 3/2016 |

OTHER PUBLICATIONS

International Search Report for PCT/KR2017/003139, dated Jun. 21, 2017, 4 pages.
Written Opinion of the ISA w/English Translation for PCT/KR2017/003139, dated Jun. 21, 2017, 18 pages.

* cited by examiner

ELECTRONIC DEVICE AND METHOD FOR PROVIDING IDENTIFICATION INFORMATION

This application is a National Phase Entry of PCT International Application No. PCT/KR2017/003139, which was filed on Mar. 23, 2017, and claims priority to Korean Patent Application No. 10-2016-0036251, which was filed on Mar. 25, 2016, the contents of each of which are incorporated herein by reference.

TECHNICAL FIELD

The present disclosure generally relates to an electronic device, and more particularly to an electronic device and a method for providing identification information.

BACKGROUND ART

Recently, various services and additional functions provided by electronic devices have gradually expanded. To improve the practical value of electronic devices and meet various demands of users, communication service providers or electronic device manufacturers are providing a greater various functions and competitively developing electronic devices so as to differentiate their devices from other companies' devices. In one example of meeting the user's demand, when the user is close to or enters a particular area, the electronic device may receive various pieces of service information provided in the particular area from a server and provide the received service information to the user.

In the prior art, in order to provide service information, an electronic device receives, in advance, a list of a plurality of transmitters and provides service information through a comparison with a transmitter located in a particular area, and thus data communication is performed in the process of receiving the list of the plurality of transmitters in advance, and a mismatch with actual information may occur due to the time difference.

In the prior art, since the distance between an electronic device adjacent to or entering a particular area and a transmitter is detected simply based on signal strength, it is difficult to accurately determine a distance due to interference of signals generated from peripheral devices and signal distortion by surrounding structures. Further, the transmitter broadcasts a signal once for 1 to 10 seconds, which causes inconvenience in that the electronic device must wait to receive a plurality of signals.

In addition, in the prior art, it may not be possible to provide different services depending on the distance between the electronic device and the transmitter and on the circumstances.

As described above, since the distance between the transmitter and the electronic device is determined simply through signal strength, adaptive services for various movement of the electronic device cannot be provided in a particular area.

Accordingly, it is required for the transmitter to transmit identification information (for example, business information) to the electronic device and for the electronic device to receive service information based on the received identification information and its own location information and provide the received information to the user. Further, it is required to provide the user with various pieces of service information according to movement of the electronic device in a particular area.

SUMMARY

In accordance with an aspect of the present disclosure, an electronic device is provided. The electronic device includes: a communication module; a sensor; and a processor, wherein the processor is configured to acquire a signal including one or more pieces of identification information corresponding to an external electronic device from the external electronic device through the communication module, detect movement of the electronic device through the sensor, select first identification information among the one or more pieces of identification information when the movement meets a first condition, select second identification information among the one or more pieces of identification information when the movement meets a second condition, and provide service information corresponding to identification information selected among the first identification information and the second identification information.

In accordance with another aspect of the present disclosure, an electronic device is provided. The electronic device includes: a first communication module; a second communication module; a memory configured to store location information of the electronic device; and a processor, wherein the processor is configured to acquire identification information corresponding to a place in which a first external electronic device is located from the first external electronic device, which is located close to the electronic device, through the first communication module, transmit the identification information and the location information to a second external electronic device through the second communication module, and receive service information corresponding to the identification information from the second external electronic device through the second communication module.

In accordance with another aspect of the present disclosure, a method of providing service information by an electronic device is provided. The method includes: acquiring identification information corresponding to a place in which a first external electronic device is located from the first external electronic device located close to the electronic device; transmitting the identification information and location information of the electronic device to the second external electronic device; and receiving service information corresponding to the identification information from the second external electronic device.

According to various embodiments of the present disclosure, an electronic device does not receive in advance a list of a plurality of transmitters in order to provide a user with service information, thereby preventing unnecessary data communication.

The present disclosure can more accurately detect a location of the electronic device, even indoors, and can also provide the user with various pieces of service information based on the accurately detected location of the electronic device by calculating the distance between the electronic device and the transmitter based on location information through the strength of a signal transmitted from the transmitter and movement of the electronic device.

Further, it is possible to provide various pieces of service information due to entry into or exit from a particular area based on walking information of the user carrying the electronic device.

DETAILED DESCRIPTION OF EXAMPLE EMBODIMENTS

Figure 1:
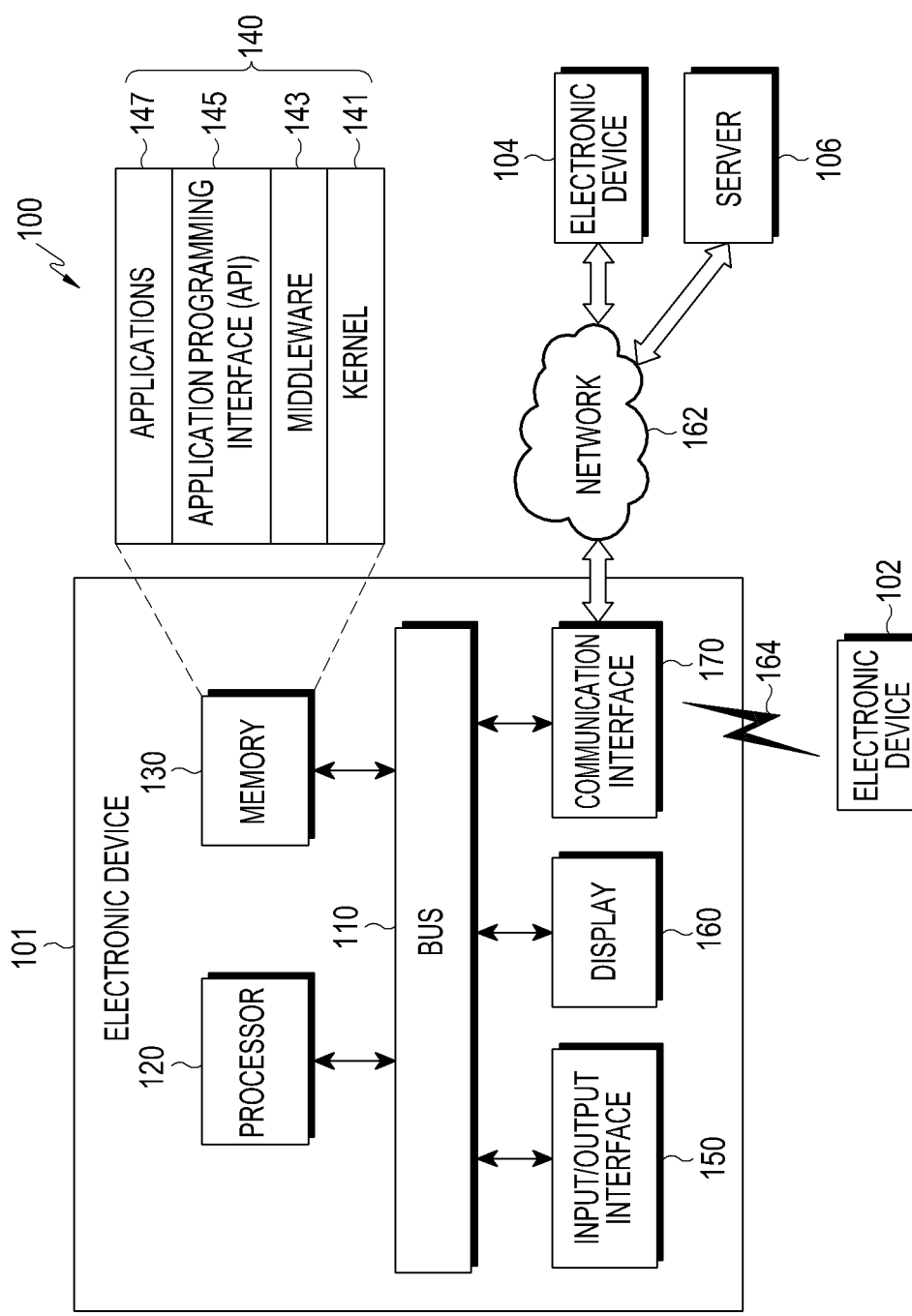
FIG. 1 illustrates an electronic device 101 within a network environment 100 according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 within a network environment 100 according to various embodiments.

The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the components 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned to the one or more application programs.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, symbols, and the like) for a user. The display 160 may include a touch screen, and may receive, for example, a touch, gesture, proximity, or hovering input using an electronic pen or the user's body part.

The communication interface 170, for example, may set communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short-range communication 164. The short-range communication 164 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (GLONASS), a BeiDou Navigation Satellite System (hereinafter referred to as "BeiDou"), and a European Global Satellite-based Navigation System (Galileo), according to a use area, a bandwidth, or the like. Hereinafter, in the present disclosure, the term "GPS" may be interchangeably used with the term "GNSS". The wired communication may include, for example, at least one of a Universal Serial Bus (USB), a High-Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of the same or a different type from the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition thereto. Another electronic device (for example, the electronic device 102 or 104) or the server 106 may execute the requested functions or the additional functions, and may deliver the result of execution to the electronic device 101. The electronic device 101 may provide the received result as it is, or may additionally process the received result to provide the requested functions or services. To this end, for example, cloud-computing, distributed-computing, or client-server-computing technology may be used.

Figure 2:
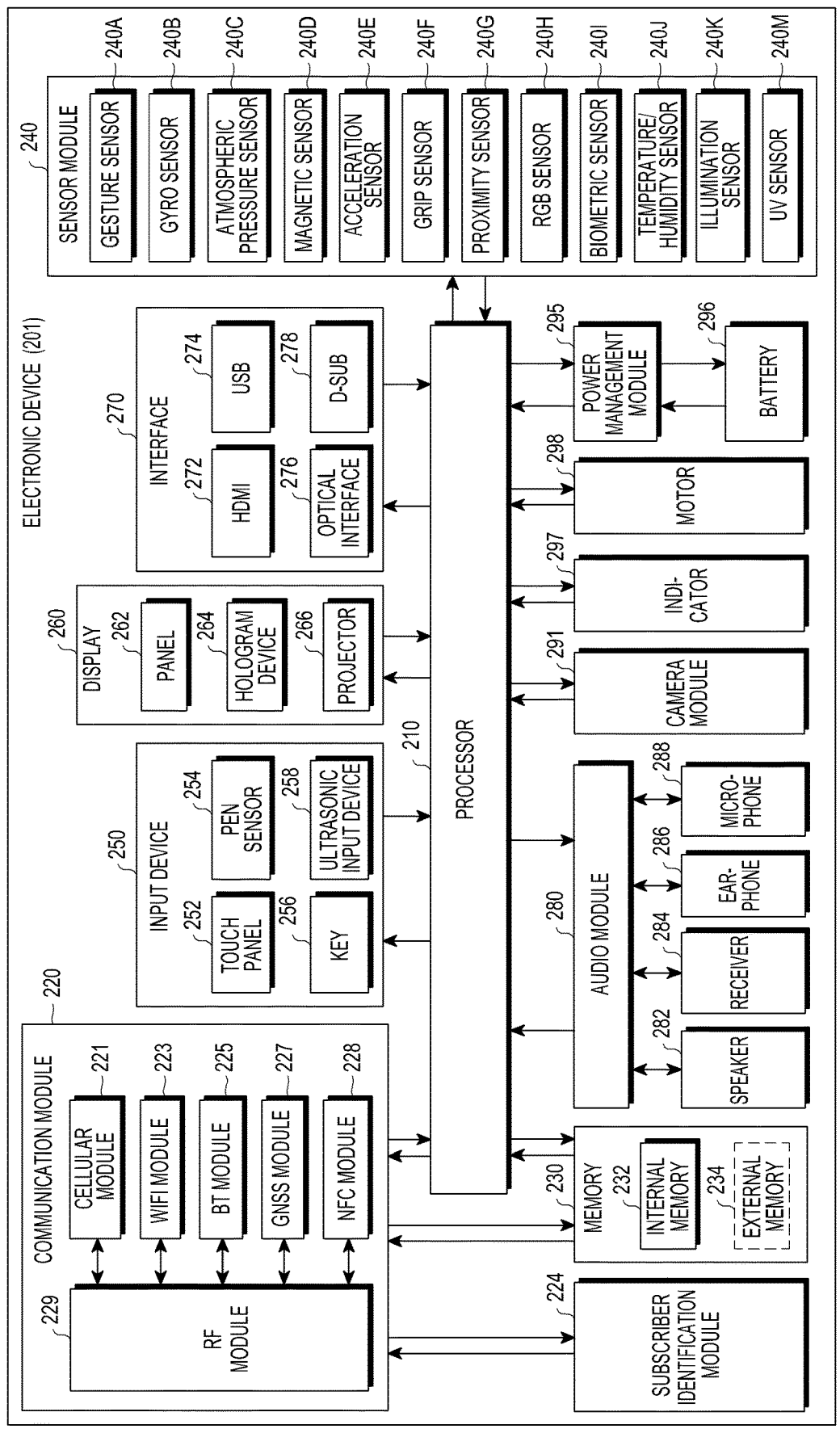
FIG. 2 is a block diagram of an electronic device 201 according to various embodiments.

FIG. 2 is a block diagram of an electronic device 201 according to various embodiments.

The electronic device 201 may include, for example, all or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto, and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory) to process the loaded instructions or data, and may store various types of data in the non-volatile memory.

The communication module 220 may have a configuration identical or similar to that of the communication interface 170 of FIG. 1. The communication module 220 may include, for example, a cellular module 221, a Wi-Fi module 223, a BT module 225, a GNSS module 227 (for example, a GPS module, a GLONASS module, a BeiDou module, or a Galileo module), an NFC module 228, and a Radio-Frequency (RF) module 229.

The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GPS module 227, and the NFC module 228 may include a processor for processing data transmitted/received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low-Noise Amplifier (LNA), an antenna, and the like. According to another embodiment, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may be, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three dimensional image in the air using light interference. According to an embodiment, the panel 262 may include a pressure sensor (or a "force sensor" interchangeably used hereinafter) for measuring the strength of pressure for a user's touch. The pressure sensor and the touch panel 252 may be implemented in the integrated form or the pressure sensor may be implemented as one or more sensor separated from the touch panel 252. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) interface 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/MultiMedia Card (MMC) interface, or an Infrared Data Association (IrDA) standard interface.

The audio module 280 may convert, for example, sound into an electrical signal and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, or the like.

The camera module 29A is a device that can photograph a still image and a dynamic image. According to an embodiment, the camera module 29A may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. The electronic device 201 may be an electronic device receiving power through a battery, but is not limited thereto. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
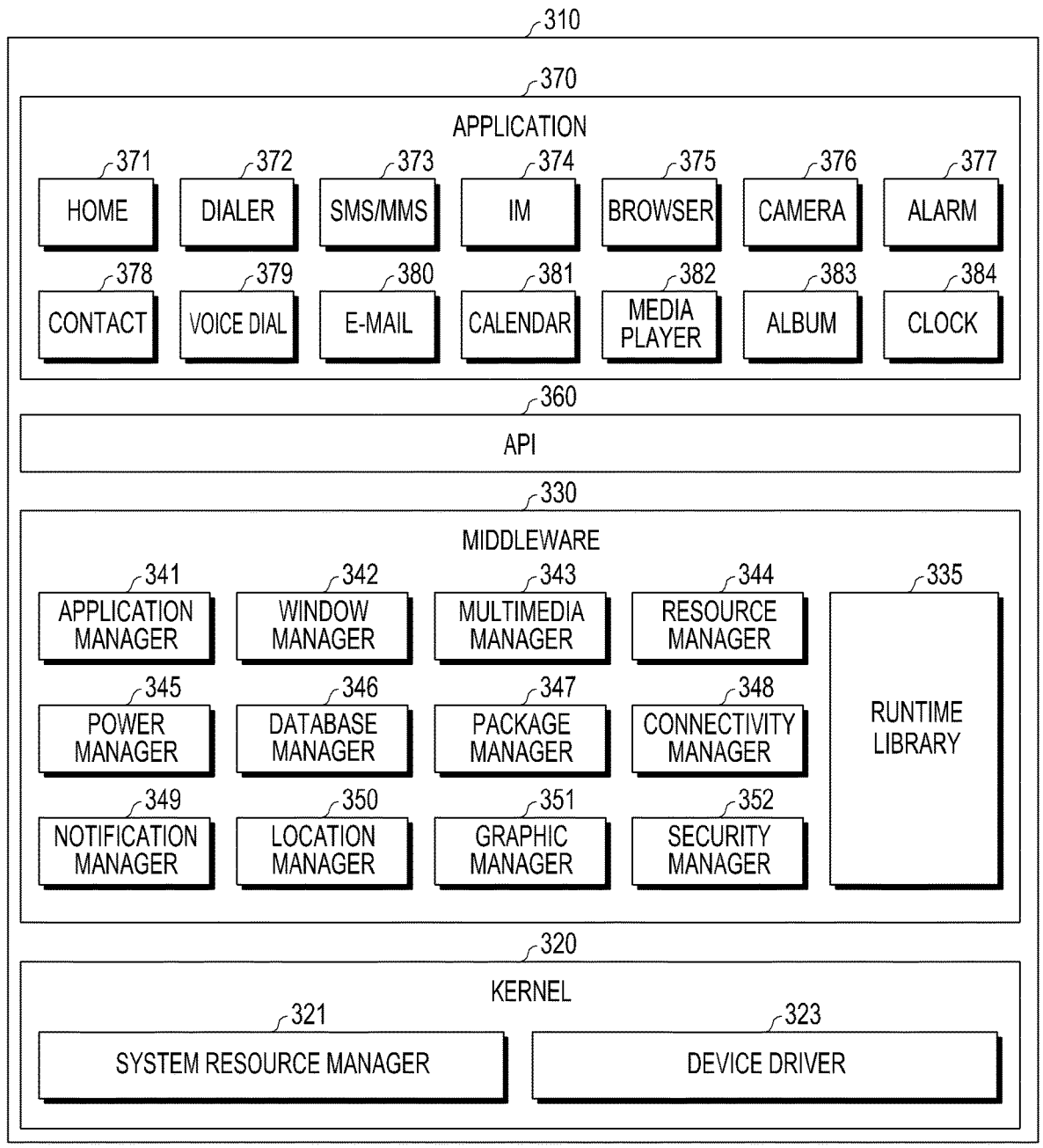
FIG. 3 is a block diagram of a program module according to various embodiments.

FIG. 3 is a block diagram of a program module according to various embodiments.

According to an embodiment, the program module 310 (for example, the program 140) may include an Operating System (OS) that controls resources relating to an electronic device (for example, the electronic device 101) and/or various applications (for example, the application programs 147) running on the operating system. The operating system may be, for example, Android™, iOS™, Windows™, Symbian™, Tizen™, Bada™, and the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use the limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, functionality for arithmetic functions, and the like.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file using a coder/decoder (codec) appropriate for the corresponding format. The resource manager 344 may manage resources, such as source code, memory, storage space, and the like of at least one of the applications 370.

The power manager 345 may operate together with, for example, a Basic Input/Output System (BIOS) to manage a battery or power and provide power information required for the operation of the electronic device. The database manager 346 may generate, search for, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or provide notification of an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to an embodiment, when the electronic device (for example, the electronic device 101) has a telephone call function, the middleware 330 may further include a telephony manager that manages a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 (for example, the application programs 147) may include, for example, a home application 371, a dialer application 372, an SMS/MMS application 373, an Instant Message application (IM) 374, a browser application 375, a camera application 376, an alarm application 377, a contact application 378, a voice dialer application 379, an email application 380, a calendar application 381, a media player application 382, an album application 383, a clock application 384, or one or more application capable of performing functions of providing health care (for example, measuring exercise quantity or blood sugar) or environmental information (for example, atmospheric pressure, humidity, or temperature information), and the like.

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). According to an embodiment, the applications 370 may include a preloaded application or a third-party application that may be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the program module 310 may be implemented (for example, executed) by, for example, the processor (for example, the processor 1410). At least some of the program module 310 may include, for example, a module, a program, a routine, a set of instructions, and/or a process for performing one or more functions.

Figure 4:
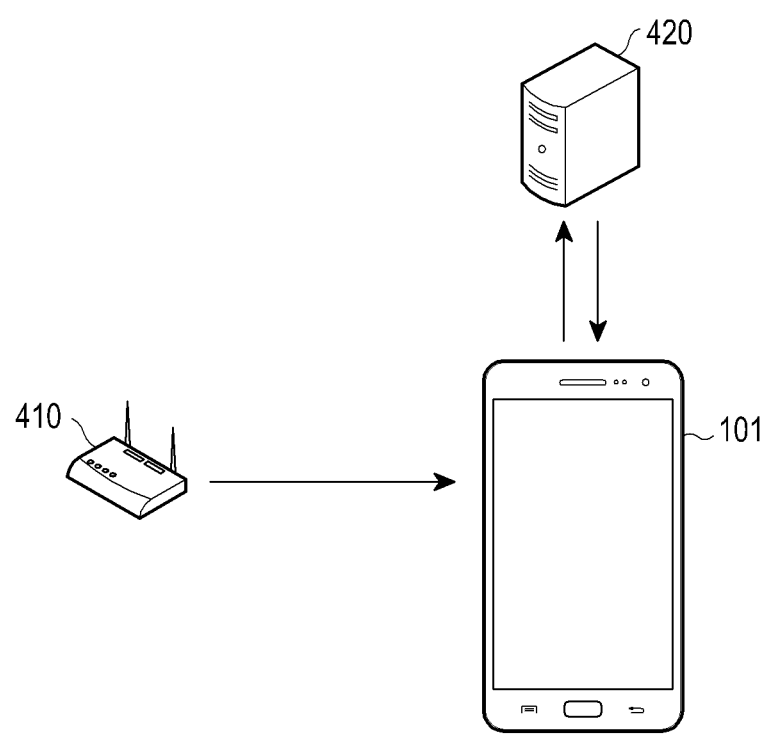
FIG. 4 illustrates a system for providing service information according to an embodiment of the present disclosure.

FIG. 4 illustrates a system for providing service information according to an embodiment of the present disclosure.

Referring to FIG. 4, the system for providing service information according to an embodiment of the present disclosure may include a transmitter 410, a server 420, and an electronic device 101.

The transmitter 410 may perform at least one function or operation performed by one of the electronic devices 102 and 104 of FIG. 1, the electronic device 101 may perform at least one function or operation performed by the electronic device 101 of FIG. 1, and the server 410 may perform at least one function or operation performed by the server 106 of FIG. 1.

According to various embodiments, the transmitter 410 is a stationary object or a mobile object existing in a particular place, and may periodically broadcast identification information (for example, business information) unrelated to location information of the transmitter 410. The identification information may include a shop name, a business type, a business name, or a combination thereof. The transmitter 410 may broadcast identification information corresponding to a place in which the transmitter 410 is located to at least one nearby electronic device. The transmitter 410 may broadcast identification information (for example, business information) to at least one electronic device existing in its own service area. Further, the transmitter 410 may broadcast a signal including its own identifier. The transmitter 410 may include various communication modules such as Bluetooth, Wi-Fi, and a wireless network.

According to various embodiments, the server 420 may receive identification information (for example, business information) and location information of the electronic device 101 from the electronic device 101. The server 420 may receive identification information that the transmitter 410 transmits to the electronic device 101 and location information acquired by the electronic device 101. The server 420 may determine a service suitable for the current location of the electronic device 101 based on the identification information and the location information received from the electronic device 101. Further, the server 420 may provide information on the determined service to the electronic device 101. The service information may be different depending on the business type, the business field, and the location of the electronic device. The server 420 may transmit at least one piece of content corresponding to a shop name, a business type, a business field, a business name, or a combination thereof to the electronic device 101 as at least part of the service information based at least partially on the identification information (for example, business information) and the location information received from the electronic device 101.

According to various embodiments, the electronic device 101 may receive identification information (for example, business information) corresponding to a place or an area in which the transmitter 410 is located from the transmitter 410, which is located at a short distance, transmit the identification information and the location information to the server 420, receive service information corresponding to the identification information from the server 420, and provide the received service information to the user. The electronic device 101 may determine whether a remaining charge of the battery 296 is smaller than a predetermined threshold value, and when the remaining charge is smaller than the predetermined threshold value, may not provide the service information to the user.

According to various embodiments, when the electronic device 101 enters (or moves to) the place or the area in which the transmitter 410 is located, the electronic device 101 may receive identification information (for example, business information) provided by a shop in the place or the area in which the transmitter 410 is located from the transmitter 410. The identification information (for example, business information) may include a shop name, a business type, a business field, a business name, or a combination thereof, and may be different according to the location of the electronic device. The electronic device 101 may determine whether the identification information (for example, business information) acquired from the transmitter 410 meets a predetermined condition. When the identification information acquired from the transmitter 410 meets the predetermined condition, the electronic device 101 may grasp the location of the electronic device 101 through at least one sensor included in the electronic device 101 before transmitting the location information of the electronic device 101 to the server 420. The electronic device 101 may scan for a signal transmitted from the transmitter 410 even when a Bluetooth module included in the electronic device 101 is in an off state. The scanned signal may be used to determine the location of the electronic device 101. The electronic device 101 may perform an operation corresponding to a Unique User Identifier (UUID) included in a data packet broadcasted by the transmitter 410 installed in a particular area. For example, as long as the UUID received from the transmitter 101 is the same, the electronic device 101 may perform the same operation regardless of the state of a user. Further, the electronic device 101 may perform a different operation based on the user's movement information (for example, whether the user walks, a walking state, a walking speed, and a step count) even though the electronic device 101 receives the same UUID. The electronic device 101 may collect user's movement information in the background and perform a different operation based on movement information collected before the time point at which the UUID is scanned. Further, the electronic device 101 may provide different pieces of service information based on movement information during a predetermined time (for example, 5 seconds) after the UUID is scanned and a signal strength after a predetermined time. The electronic device 101 may determine whether the identification information (for example, business information) includes a business type related to the electronic device, a shop name, a business field, a business name, or a combination thereof. Alternatively, the electronic device 101 may determine whether the identification information (for example, business information) includes a predetermined business type or a predetermined shop name related to the electronic device. When the identification information includes the predetermined business type or the predetermined shop name, the electronic device 101 may determine that the predetermine condition is met.

According to various embodiments, the electronic device 101 may collect movement information of the electronic device 101 before receiving or acquiring the identification information (for example, business information). In general, the user carrying the electronic device 101 may enter a particular place or a shop that provides a service for business and, in this case, the electronic device 101 may collect movement (for example, walking) information for a moving path through at least one sensor before receiving the identification information (for example, business information). The movement information may include various pieces of information on whether the user walks, a walking state, a walking speed, and a step count. The electronic device 101 may determine whether the electronic device 101 moves to a place in which the transmitter 410 is located at a time point at which the electronic device 101 receives a signal transmitted by the transmitter 410. The electronic device 101 may determine a moving path, a movement distance, or a movement direction of the user through movement information collected until the time point at which the signal is received. The electronic device 101 may grasp the current location through the strength of the received signal. The electronic device 101 may determine whether the current location of the electronic device 101 is within a first area (for example, within 8 to 10 m) spaced apart from the transmitter 410 by a predetermined distance (for example, 8 m), whether the current location is within a second area (for example, within 3 to 8 m) spaced apart from the transmitter 410 by a predetermined distance (for example, 3 m), or whether the current location is within a third area (for example, within 3 m) spaced apart from the transmitter 410 by a predetermined distance (for example, 1 m) based at least on identification information (for example, business information) and collected location information. The electronic device 101 may transmit location information and identification information (for example, business information) corresponding to movement between areas to the server 420. The electronic device 101 may acquire location information by periodically grasping movement of the electronic device 101 (or walking of the user carrying the electronic device 101) within the first area, the second area, or the third area and transmit the acquired location information and identification information (for example, business information) to the server 420. The third area may exist within the second area, and may be smaller than the second area, and the second area may exist within the first area, and may be smaller than the first area. Each of the predetermined distances may be variably controlled, and the first area to the third area may also be variably controlled. The electronic device 101 may transmit location information having each area corresponding to the identification information (for example, business information) to the server 420.

According to various embodiments, the electronic device 101 may calculate a distance to the transmitter 410 by analyzing the strength of the received signal. Further, the electronic device 101 may perform calibration in order to accurately calculate the distance. In general, since signal interference may occur according to ambient radio waves and structures, the strength of the signal is not reduced by the distance. For example, when there is a structure jamming between the transmitter 410 for transmitting the signal and the electronic device 101, a signal having a strength lower than that of another electronic device located at the same distance may be detected. As described above, when the distance is calculated through the strength of the signal, an error may be generated according to a surrounding environment. Accordingly, in order to calculate the distance more accurately, calibration is performed. The calibration may include an operation of shaking the electronic device.

According to various embodiments, the electronic device 101 may transmit the identification information (for example, business information) received from the transmitter 410 and the acquired location information to the server 420. The electronic device 101 may combine the identification information (for example, business information) and the location information and transmit the combined information to the server 420. The electronic device 101 may combine periodically received identification information (for example, business information) and location information corresponding to movement of the electronic device 101 and transmit the combined information to the server 420 periodically or according to a user's request. The electronic device may check a remaining charge of the battery, and when the checked remaining charge of the battery is smaller than a predetermined value, the electronic device 101 may not transmit the identification information (for example, business information) nor location information to the server 420.

According to various embodiments, the electronic device 101 may receive service information corresponding to the identification information (for example, business information) and the location information transmitted to the server 420. The electronic device 101 may provide (for example, display through a display, output in the form of a voice through a speaker, or output in the form of vibration) the service information received from the server 420 to the user. The electronic device 101 may receive at least one piece of content corresponding to the identification information (for example, business information) and the location information transmitted to the server 420 as at least part of the service information. When the current location of the electronic device 101 is within the first area, spaced apart from the transmitter 410 by a predetermined distance, the electronic device 101 may receive service information corresponding to the first area (for example, within 8 to 10 m) from the transmitter 410 and output the received service information through a display. When the current location of the electronic device 101 is within the second area (for example, within 3 to 8 m) spaced apart from the transmitter 410 by a predetermined distance, the electronic device 101 may receive service information corresponding to the second area from the transmitter 410 and output the received service information through the display. When the current location of the electronic device 101 is within the third area spaced apart from the transmitter 410 by a predetermined distance, the electronic device 101 may receive service information corresponding to the third area (for example, within 3 m) from the transmitter 410 and output the received service information through the display. For example, when the electronic device 101 is located in the first area, the electronic device 101 may receive a message related to a visit to a particular place (for example, a welcome notification message, information on products sold in the particular place, or discount information) from the server 420 and output the received message. When the electronic device 101 is located in the second area, the electronic device 101 may receive information corresponding to the place (for example, information related to products displayed in the second area) from the server 420 and output the received information. When the electronic device 101 is located in the third area, the electronic device 101 may receive additional information provided in the place (for example, information on coupons applicable in payment and card discount information) from the server 420 and output the received information.

The electronic device 101 according to various embodiments of the present disclosure may include a communication module; a sensor; and a processor, wherein the processor is configured to acquire a signal including one or more pieces of identification information corresponding to an external electronic device from the external electronic device through the communication module, detect movement of the electronic device through the sensor, select first identification information among the one or more pieces of identification information when the movement meets a first condition, select second identification information among the one or more pieces of identification information when the movement meets a second condition, and provide service information corresponding to identification information selected among the first identification information and the second identification information.

According to an embodiment, the processor may be configured to acquire information regarding a distance to the external electronic device based at least on the signal and determine whether the first condition or the second condition is met based additionally on the distance.

According to an embodiment, the processor may be configured to perform calibration for determining the distance based at least on the movement.

According to an embodiment, the electronic device may further include a display, and the processor may be configured to provide the first identification information or the second identification information through at least part of the display.

According to an embodiment, the processor may be configured to refrain from presenting first service information and provide second service information when the movement meeting the first condition is changed to movement meeting the second condition.

The electronic device 101 according to various embodiments of the present disclosure may include: a first communication module; a second communication module; a memory configured to store location information of the electronic device; and a processor, wherein the processor is configured to acquire identification information corresponding to a place in which a first external electronic device is located from the first external electronic device located close to the electronic device through the first communication module, transmit the identification information and the location information to a second external electronic device through the second communication module, and receive service information corresponding to the identification information from the second external electronic device through the second communication module.

According to an embodiment, the electronic device 101 may further include a display, and the processor may be configured to provide the service information through the display.

According to an embodiment, the electronic device 101 may further include at least one sensor, and the processor may be configured to acquire the location information through the sensor before transmitting the location information when the acquired identification information meets a predetermined condition.

According to an embodiment, the processor may be configured to determine whether the identification information includes a predetermined business type or a predetermined shop name related to the electronic device, and when the identification information includes the predetermined business type or the predetermined shop name, determine that the predetermined condition is met.

According to an embodiment, the identification information may include a shop name, a business type, a business name, or a combination thereof.

According to an embodiment, the processor may be configured to receive at least one piece of content corresponding to the identification information and the location information as at least part of the service information.

According to an embodiment, the processor may be configured to collect movement information of the electronic device before acquiring the identification information, determine whether movement to a place in which the first external electronic device is located is generated at a time point at which a signal transmitted by the first external electronic device is received, and detect the current location of the electronic device based on the collected movement information and the strength of the received signal.

According to an embodiment, the processor may be configured to calculate a distance to a first external electronic device through a strength of the received signal and perform calibration to accurately calculate the distance.

According to an embodiment, the processor may be configured to output service information corresponding to a first area through a display when the detected current location is within the first area spaced apart from the first external electronic device by a predetermined distance.

According to an embodiment, the processor may be configured to output service information corresponding to a second area through the display when the detected current location is within the second area spaced apart from the first external electronic device by a predetermined distance.

According to an embodiment, the processor may be configured to output service information corresponding to a third area through the display when the detected current location is within the third area spaced apart from the first external electronic device by a predetermined distance.

According to an embodiment, the third area may exist within the second area and may be smaller than the second area, and the second area may exist within the first area and may be smaller than the first area.

According to an embodiment, the processor may be configured to output service information corresponding to movement between respective areas through the display.

According to an embodiment, the processor may be configured to acquire location information by periodically detecting movement of the electronic device within the first area, the second area, or the third area, transmit the acquired location information and the acquired identification information to the second external electronic device, and receive service information corresponding to the detected movement from the second external electronic device and display the received service information through the display.

According to an embodiment, the service information corresponding to the first area may include a welcome notification message indicating a visit to the place, the service information corresponding to the second area may include information corresponding to the place, and the service information corresponding to the third area may include additional information provided in the place.

According to an embodiment, the processor may be configured to check a remaining charge of a battery of the electronic device, and when the checked remaining charge of the battery is smaller than a predetermined value, control not to provide the received service information.

Figure 5:
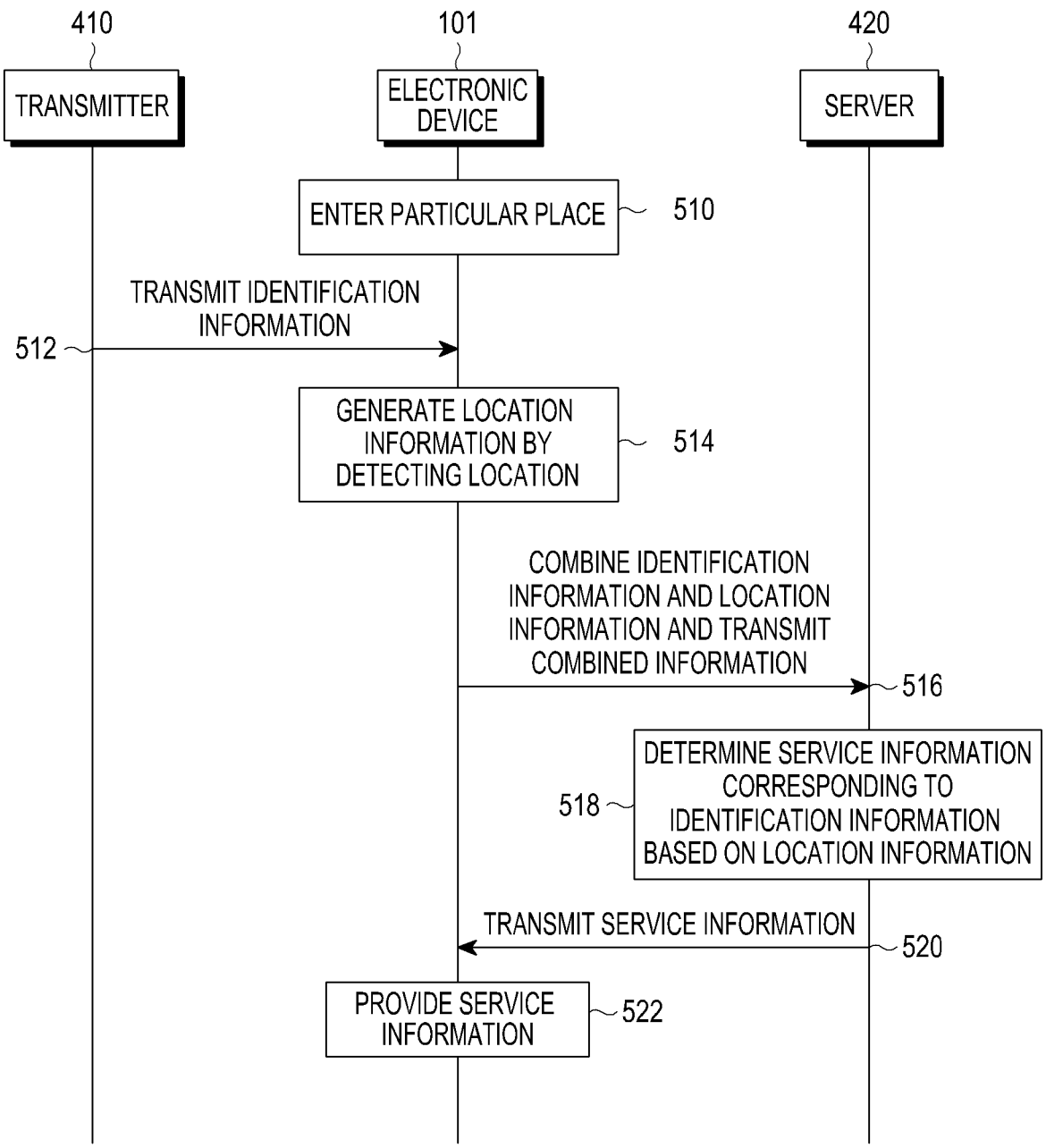
FIG. 5 illustrates a process in a system for providing service information according to an embodiment of the present disclosure.

FIG. 5 illustrates a process in a system for providing service information according to an embodiment of the present disclosure.

Hereinafter, the process in the system for providing service information according to an embodiment of the present disclosure will be described in detail with reference to FIG. 5.

The system according to an embodiment of the present disclosure may include the transmitter 410, the electronic device 101, and the server 420, but this is only an example, and may further include a relay (not shown) for relaying signals or data transmitted/received between respective devices.

According to various embodiments, the electronic device 101 may detect entry into a particular place in step 510. When the user carrying the electronic device 101 moves, the electronic device 101 may periodically check or calculate a movement direction, a movement speed, and a movement distance of the user. When the user moves, the electronic device 101 may determine that the user enters a region or an area in which the transmitter 410 is located in response to detection of a signal received from an external electronic device (for example, the transmitter 410). The electronic device 101 may detect the signal transmitted from the transmitter 410 through at least one communication module included in the electronic device 101 and determine that the user is entering the region or the area in which the transmitter 410 is located through the detected signal.

According to various embodiments, when it is detected that the electronic device 101 is entering the particular place, the transmitter 410 may transmit identification information (for example, business information) to the electronic device 101 in step 512. The transmitter 410 may exist in a shop located within a building and periodically broadcast a signal (for example, including a beacon signal or a Unique User Identifier (UUID)). The transmitter 410 may be a stationary object or a mobile object existing in a particular place, and may periodically broadcast business information unrelated to location information of the transmitter 410. The identification information may include a brand name, a business type, a business name, or a combination thereof. The transmitter 410 may broadcast identification information (for example, business information) to at least one electronic device existing in its own service area. Further, the transmitter 410 may broadcast a signal including its own identifier. The transmitter 410 may transmit the identification information to the electronic device 101 through any of various communication modules such as Bluetooth, Wi-Fi, and a wireless network.

According to various embodiments, the electronic device 101 may generate location information by grasping its own location in step 514, and may combine the identification information and the location information and transmit the combined information in step 516. The electronic device 101 may collect movement information of the electronic device 101 before receiving or acquiring the identification information. In general, the user carrying the electronic device 101 may move to a particular place or a store (or a shop or a theater) that provides a service for business, and in this case the electronic device 101 may collect movement information for a moving path before receiving the identification information. The electronic device 101 may determine whether movement to a place in which the transmitter 410 is located occurs at the time point at which a signal transmitted by the transmitter 410 is received. The electronic device 101 may determine a moving path, a movement distance, or a movement direction of the user through movement information collected until the time point at which the signal is received. The electronic device 101 may grasp the current location through the strength of the received signal. In order to reduce the amount of power consumed by a sensing operation for detecting the current location, the electronic device 101 may use a separate low-power processor. For example, when the amount of power consumed for detecting the current location is larger than a predetermined value, the electronic device 101 may switch an operation mode of the electronic device 101 to a low-power mode and detect the current location through the low-power mode. The electronic device 101 may determine whether the current location of the electronic device 101 is within a first area (for example, within 8 to 10 m) spaced apart from the transmitter 410 by a predetermined distance (for example, 8 m), whether the current location is within a second area (for example, within 3 to 8 m) spaced apart from the transmitter 410 by a predetermined distance (for example, 3 m), or whether the current location is within a third area (for example, within 3 m) spaced apart from the transmitter 410 by a predetermined distance (for example, 1 m) based at least one identification information (for example, business information) and collected location information. The electronic device 101 may transmit location information and identification information corresponding to movement between respective areas to the server 420. The electronic device 101 may periodically detect movement of the electronic device 101 (walking of the user carrying the electronic device 101) within the first area, the second area, or the third area, acquire location information, and transmit the acquired location information and identification information to the server 420.

According to various embodiments, the server 420 may determine service information to be provided to the electronic device 101 based on the location information and the identification information (for example, business information) received from the electronic device 101 in step 518 and transmit the determined service information to the electronic device 101 in step 520. The server 420 may determine service information corresponding to the identification information based on the location information and transmit the determined service information to the electronic device 101.

According to various embodiments, the server 420 may receive identification information (for example, business information) and location information of the electronic device 101 from the electronic device 101. The server 420 may receive the identification information (for example, business information) that the transmitter 410 transmits to the electronic device 101 and the location information acquired by the electronic device 101. The server 420 may determine a service suitable for the current location of the electronic device 101 based on the identification information and the location information received from the electronic device 101. Further, the server 420 may provide information on the determined service to the electronic device 101. The service information may be different according to the business type, the business field, and the location of the electronic device. The server 420 may transmit at least one piece of content corresponding to a shop name, a business type, a business field, a business name, or a combination thereof to the electronic device 101 as at least part of the service information based at least partially on the identification information and the location information received from the electronic device 101. For example, when the electronic device 101 is located in the first area, the server 420 may transmit a message related to a visit to a particular place (for example, a welcome notification message, information on products sold in the particular place, or discount information) to the electronic device 101. When the electronic device 101 is located in the second area, the server 420 may transmit information corresponding to a shop located in the particular place to the electronic device 101. The information may include information (for example, a price and a time) on various products (for example, a menu item and a category) provided in the shop. Further, the information may include various pieces of information according to the business field of the shop or the type of service industry. When the electronic device 101 is located in the third area, the server 420 may transmit additional information (for example, a membership card, a discount card, and coupons) to the electronic device 101. For example, when the user carrying the electronic device 101 moves (or movement is made) in a state in which the service information is provided, the electronic device 101 may transmit location information changed by the movement to the server 420, and the server 420 may transmit service information, determined based on the received location information, to the electronic device 101 again.

According to various embodiments, the electronic device 101 may provide the service information received from the server 420 to the user in step 522. The electronic device 101 may output various pieces of service information received from the server 420 in various methods, such as a voice, vibration, and a popup to allow the user to recognize the service information. The electronic device 101 may receive service information corresponding to the identification information and the location information transmitted to the server 420. The electronic device 101 may provide (display through a display, output in the form of a voice through a speaker, or output in the form of vibration) the service information received from the server 420 to the user. The electronic device 101 may receive at least one piece of content corresponding to the identification information and the location information transmitted to the server 420 as at least part of the service information. The electronic device 101 may provide different pieces of information to the user based on a distance between the transmitter 410 and the electronic device 101. Upon receiving the service information from the server 420, the electronic device 101 may provide different pieces of information to the user based on the distance. For example, when the current location of the electronic device 101 is within the first area, spaced apart from the transmitter 410 by a predetermined distance, the electronic device 101 may receive service information corresponding to the first area (for example, within 8 to 10 m) from the transmitter 410 and output the received service information through the display. For example, when the current location of the electronic device 101 is within the second area (for example, within 3 to 8 m), spaced apart from the transmitter 410 by a predetermined distance, the electronic device 101 may receive service information corresponding to the second area from the transmitter 410 and output the received service information through the display. When the current location of the electronic device 101 is within the third area, spaced apart from the transmitter 410 by a predetermined distance, the electronic device 101 may receive service information corresponding to the third area (for example, within 3 m) from the transmitter 410 and output the received service information through the display. For example, when the electronic device 101 is located in the first area, the electronic device 101 may receive a message related to a visit to a particular place (for example, a welcome notification message, information on a product sold in the particular place, or discount information) from the server 420 and output the received message. The message may include various messages that welcome the entry of the user into the particular place. When the electronic device 101 is located within the second area, the electronic device 101 may receive information corresponding to the place from the server 420 and output the received information. The information may include information (for example, a price and a time) on various products (for example, a menu item and a category) provided in the shop. Further, the information may include various pieces of information according to the business field of the shop or the type of service industry. When the electronic device 101 is located within the third area, the electronic device 101 may receive additional information provided in the place from the server 420 and output the additional information. The additional information may include, for example, various pieces of information such as a membership card, a discount card, coupons, and events in order to reduce user's costs or information on a wide range of benefits that can be provided to the user. The electronic device 101 may determine whether the remaining charge of the battery 296 is smaller than a predetermined threshold value, and when the remaining charge is smaller than the predetermined threshold value, may not provide the service information to the user.

Further, the electronic device 101 may acquire a signal including one or more pieces of identification information corresponding to an external electronic device from the external electronic device (for example, the transmitter 410) through the communication module 220 and detect movement of the electronic device 101 through at least one sensor included in the sensor module 240. When the detected movement meets a first condition, the electronic device 101 may select first identification information among the one or more pieces of identification information. When the detected movement meets a second condition, the electronic device 101 may select second identification information among the one or more pieces of identification information. The electronic device 101 may provide the user with service information corresponding to identification information selected among the first identification information and the second identification information. The electronic device 101 may acquire information regarding a distance to the external electronic device based at least partially on the acquired signal and determine whether the first condition or the second condition is met based on the distance. The electronic device 101 may be configured to perform calibration for determining the distance based at least partially on the detected movement. The electronic device 101 may further include the display 160, and the electronic device 101 may provide the first identification information or the second identification information through at least part of the display. When the movement changes from the movement meeting the first condition to the movement meeting the second condition, the electronic device 101 may refrain from presenting first service information, and instead provide second service information.

Figure 6:
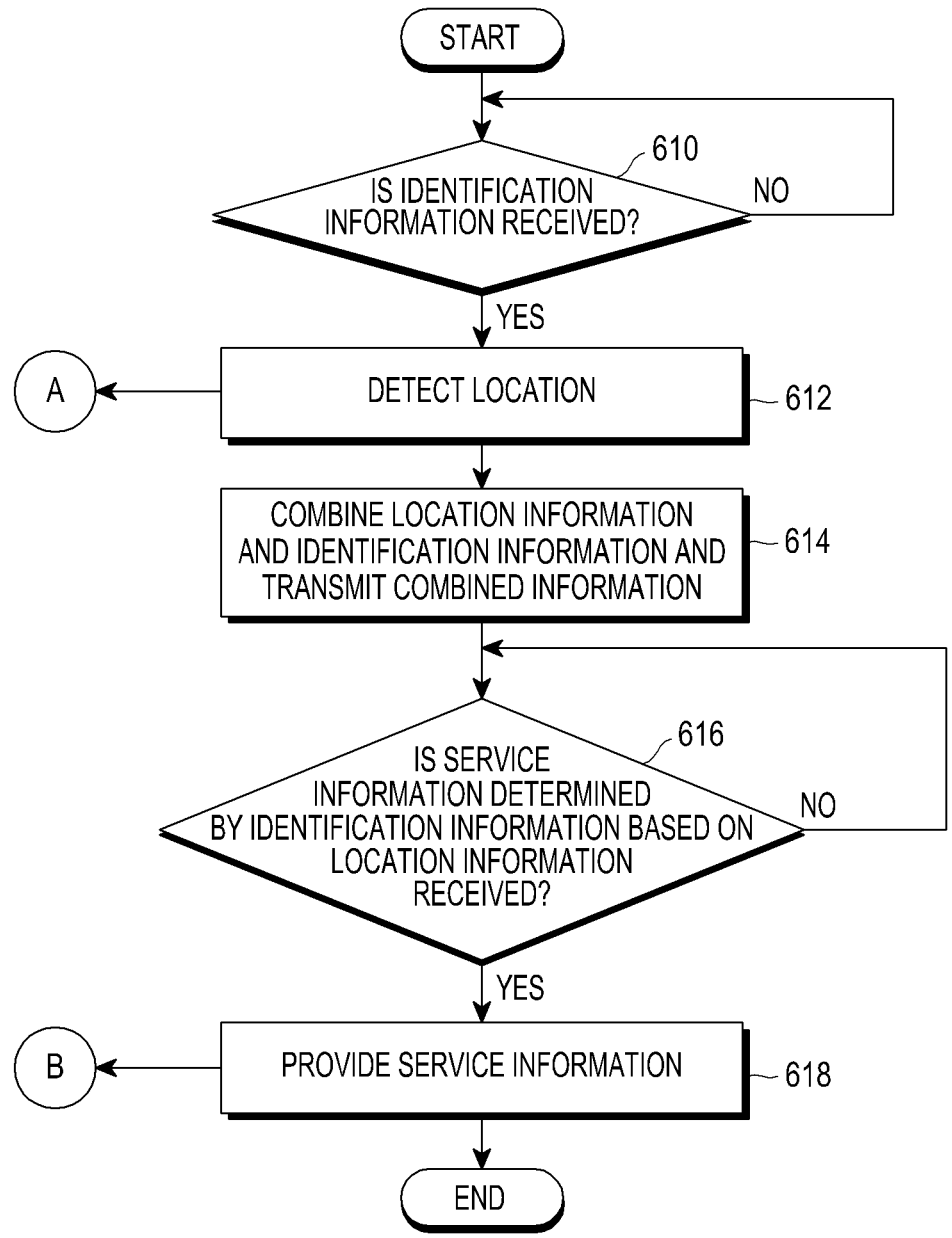
FIG. 6 is a flowchart illustrating a process in which the electronic device provides service information according to various embodiments of the present disclosure.

FIG. 6 is a flowchart illustrating a process in which the electronic device provides service information according to various embodiments of the present disclosure.

Hereinafter, a process in which another electronic device provides service information according to various embodiments of the present disclosure will be described in detail with reference to FIG. 6

When receiving identification information (for example, business information) in step 610, the electronic device 101 (for example, the processor 120) may detect a location in step 612.

According to various embodiments, the electronic device 101 (for example, the processor 120) may periodically receive business information unrelated to the location information of the transmitter 410. The identification information may include a brand name, a business type, a business name, or a combination thereof. Further, the electronic device 101 (for example, the processor 120) may receive a signal including an identifier of the transmitter 410. The electronic device 101 may receive the identification information through any of various communication modules such as Bluetooth, Wi-Fi, and a wireless network.

According to various embodiments, the electronic device 101 (for example, the processor 120) may collect movement information of the electronic device 101 before receiving or acquiring the identification information. In general, the user carrying the electronic device 101 can move to a particular place or a store (or a shop or a theater) that provides a service for business, in which case the electronic device 101 (for example, the processor 120) may collect walking information for a moving path before receiving the identification information. The electronic device 101 (for example, the processor 120) may determine whether movement to a place in which the transmitter 410 is located is generated at the time point at which the signal transmitted by the transmitter 410 is received. The electronic device 101 may use a separate low-power processor in order to reduce the amount of power consumed by a sensing operation for determining whether the movement occurs. For example, when an amount of power consumed for detecting the generation of movement is larger than a predetermined threshold value, the electronic device 101 may switch an operation mode of the electronic device 101 to a low-power mode and determine whether movement occurs through the low-power mode. The electronic device 101 (for example, the processor 120) may determine a moving path, a movement distance, or a movement direction of the user through walking information collected until the time point at which the signal is received. The electronic device 101 (for example, the processor 120) may detect a current location through a strength of the signal transmitted from the transmitter 410. The electronic device 101 (for example, the processor 120) may determine whether the current location of the electronic device 101 is within a first area (for example, within 8 to 10 m) spaced apart from the transmitter 410 by a predetermined distance (for example, 8 m), whether the current location is within a second area (for example, within 3 to 8 m) spaced apart from the transmitter 410 by a predetermined distance (for example, 3 m), or whether the current location is within a third area (for example, within 3 m) spaced apart from the transmitter 410 by a predetermined distance (for example, 1 m) based at least on the identification information and the collected location information. The determination of the location of the electronic device 101 (for example, the processor 120) will be described in detail with reference to FIG. 7.

According to various embodiments, the electronic device 101 (for example, the processor 120) may combine the location information and the identification information (for example, business information) and transmit the combined information in step 614. The electronic device 101 (for example, the processor 120) may combine location information and identification information corresponding to movement between respective areas and transmit the combined information to the server 420. The electronic device 101 may periodically detect movement of the electronic device 101 (or walking of the user carrying the electronic device 101) within the first area, the second area, or the third area, acquire location information, combine the acquired location information and identification information, and provide the combined information to the server 420.

According to various embodiments, when service information determined by the identification based on the location information is received in step 616, the electronic device 101 (for example, the processor 120) may provide service information in step 618. The electronic device 101 (for example, the processor 120) may receive the service information determined by the identification information and the location information of the electronic device 101 from the server 420. The electronic device 101 (for example, the processor 120) may receive service information suitable for the current location of the electronic device 101 determined by the server 420. The service information may differ according to a business type, a business field, and a location of the electronic device. The electronic device 101 (for example, the processor 120) may receive at least one piece of content corresponding to a shop name, a business type, a business field, a business name, or a combination thereof from the server 420 as at least part of the service information based at least on the transmitted identification information and location information. For example, when the electronic device 101 (for example, the processor 120) is located in the first area, the electronic device 101 may receive a message related to a visit to a particular place (for example, a welcome notification message, information on products sold in the particular place or discount information) from the server 420. When the electronic device 101 is located in the second area, the electronic device 101 (for example, the processor 120) may receive information corresponding to a shop located in a particular place from the server 420. The information may include information (for example, a price and a time) on various products (for example, a menu item and a category) provided in the shop. Further, the information may include various pieces of information according to the business field of the shop or the type of service industry. When the electronic device 101 is located in the third area, the electronic device 101 (for example, the processor 120) may receive additional information (for example, a membership card, a discount card, and coupons) from the server 420. For example, when the user carrying the electronic device 101 moves (when movement occurs) in a state in which the service information is provided, the electronic device 101 (for example, the processor 120) may transmit location information changed by the generated movement to the server 420 and receive service information determined based at least partially on the transmitted location information from the server 420.

According to various embodiments, the electronic device 101 (for example, the processor 120) may provide the user with the service information received from the server 420. The electronic device 101 (for example, the processor 120) may output various pieces of service information received from the server 420 through various methods such as a voice, vibration, and a popup to allow the user to recognize the service information. The electronic device 101 (for example, the processor 120) may receive service information corresponding to the identification information and the location information transmitted to the server 420. The electronic device 101 (for example, the processor 120) may provide (display through the display, output in the form of voice through the speaker, or output in the form of vibration) the user with service information received from the server 420. The electronic device 101 (for example, the processor 120) may receive at least one piece of content corresponding to the identification information and the location information transmitted to the server 420 as at least part of the service information and provide the content to the user. The electronic device 101 may provide different pieces of information to the user based on the distance between the transmitter 410 and the electronic device 101. When receiving the service information from the server 420, the electronic device 101 may provide different pieces of information to the user based on the distance. For example, when the current location of the electronic device 101 is within the first area spaced apart from the transmitter 410 by a predetermined distance, the electronic device 101 may receive service information corresponding to the first area (for example, within 8 to 10 m) from the transmitter 410 and output the received service information through the display. For example, when the current location of the electronic device 101 is within the second area (for example, within 3 to 8 m) spaced apart from the transmitter 410 by a predetermined distance, the electronic device 101 (for example, the processor 120) may receive service information corresponding to the second area from the transmitter 410 and output the received service information through the display. For example, when the current location of the electronic device 101 is within the third area spaced apart from the transmitter 410 by a predetermined distance, the electronic device 101 (for example, the processor 120) may receive service information corresponding to the third area (for example, within 3 m) from the transmitter 410 and output the received service information through the display. For example, when the electronic device is located in the first area, the electronic device 101 (for example, the processor 120) may receive a message related to a visit to a particular place (for example, a welcome notification message, information on products sold in the particular place, or discount information) from the server 420 and output the received message. The message may include various messages that welcome the entry of the user into the particular place. When the electronic device 101 is located in the second area, the electronic device 101 (for example, the processor 120) may receive information corresponding to the place (for example, information related to products displayed in the second area) from the server 420 and output the received information. The information may include information (for example, a price and a time) on various products (for example, a menu item and a category) provided in the shop. Further, the information may include various pieces of information according to the business field of the shop or the type of service industry. When the electronic device 101 is located in the third area, the electronic device 101 (for example, the processor 120) may receive additional information provided in the place (for example, information on coupons applicable to payment and card discount information) from the server 420 and output the received additional information. The additional information may include, for example, various pieces of information such as a membership card, a discount card, coupons, and events in order to reduce user's costs or information on a wide range of benefits that can be provided to the user. The electronic device 101 may determine whether a remaining charge of the battery 296 is smaller than a predetermined threshold value, and when the remaining charge is smaller than the predetermined threshold value, may not provide the user with the service information. The provision of services by the electronic device 101 will be described in detail with reference to FIG. 8.

Further, the electronic device 101 may acquire a signal including one or more pieces of identification information corresponding to an external electronic device from the external electronic device (for example, the transmitter 410) through the communication module 220 and detect movement of the electronic device 101 through at least one sensor included in the sensor module 240. When the detected movement meets a first condition, the electronic device 101 may select first identification information among the one or more pieces of identification information. When the detected movement meets a second condition, the electronic device 101 may select second identification information among the one or more pieces of identification information. The electronic device 101 may provide service information corresponding to identification information selected among the first identification information and the second identification information to the user. The electronic device 101 may acquire information regarding a distance to the external electronic device based at least partially on the acquired signal and determine whether the first condition or the second condition is met based on the distance. The electronic device 101 may be configured to perform calibration for determining the distance based at least partially on the detected movement. The electronic device 101 may further include the display 160, and the electronic device 101 may provide the first identification information or the second identification information through at least part of the display. When the movement changes from the movement meeting the first condition to the movement meeting the second condition, the electronic device 101 may refrain from presenting first service information, and may provide second service information.

For example, when the electronic device 101 is a smart car, the electronic device 101 may receive a GPS signal and determine a movement condition of the electronic device 101. For example, the electronic device 101 may determine whether a moving car is on an expressway, a national highway, or on a road in a city based at least partially on the received GPS signal. The electronic device 101 may differently select identification information according to various conditions.

A method of providing service information by the electronic device 101 according to various embodiments of the present disclosure may include an operation of acquiring a signal including one or more pieces of identification information corresponding to an external electronic device from the external electronic device through the communication module, an operation of detecting movement of the electronic device through the sensor, an operation of selecting first identification information among the one or more pieces of identification information when the movement meets a first condition, an operation of selecting second identification information among the one or more pieces of identification information when the movement meets a second condition, and an operation of providing service information corresponding to identification information selected among the first identification information and the second identification information.

According to an embodiment, the method may further include an operation of acquiring a distance to the external electronic device based at least on the signal and an operation of determining whether the first condition or the second condition is met based additionally on the distance.

According to an embodiment, the method may further include an operation of performing calibration for determining the distance based at least on the movement.

According to an embodiment, the method may further include refraining from presenting first service information and providing second service information when the movement meeting the first condition is changed to movement meeting the second condition.

A method of providing service information by the electronic device 101 according to various embodiments of the present disclosure may include an operation of acquiring identification information corresponding to a place in which a first external electronic device is located from the first external electronic device, which is located close to the electronic device, an operation of transmitting the identification information and location information of the electronic device to the second external electronic device, and, an operation of receiving service information corresponding to the identification information from the second external electronic device.

According to an embodiment, the present disclosure may further include an operation of providing the received service information through a display.

According to an embodiment, the present disclosure may further include an operation of acquiring the location information through at least one sensor included in the electronic device before transmitting the location information when the acquired identification information meets a predetermined condition.

According to an embodiment, the operation of acquiring the location information may include an operation of determining whether the acquired identification information includes a predetermined business type or a predetermined shop name related to the electronic device and an operation of, when the identification information includes the predetermined category or the predetermined shop name, determining that the predetermined condition is met.

According to an embodiment, the operation of receiving the service information may include an operation of receiving at least one piece of content corresponding to the acquired identification information and the location information as at least part of the service information.

According to an embodiment, the present disclosure may further include an operation of collecting movement information of the electronic device before acquiring the identification information, an operation of determining whether movement occurs to a place in which the first external electronic device is located at a time point at which a signal transmitted by the first external electronic device is received, and an operation of detecting a current location of the electronic device through the collected movement information and the strength of the received signal.

According to an embodiment, the operation of detecting the current location may include an operation of calculating a distance to the first external electronic device through the strength of the received signal and an operation of performing calibration to accurately calculate the distance.

According to an embodiment, the operation of receiving the service information may include an operation of outputting service information corresponding to a first area through a display when the detected current location is within the first area, which is spaced apart from the first external electronic device by a predetermined distance.

According to an embodiment, the operation of receiving the service information may include an operation of outputting service information corresponding to a second area through the display when the detected current location is within the second area, which is spaced apart from the first external electronic device by a predetermined distance.

According to an embodiment, the operation of receiving the service information may include an operation of outputting service information corresponding to a third area through the display when the detected current location is within the third area, which is spaced apart from the first external electronic device by a predetermined distance.

According to an embodiment, the third area may exist within the second area and may be smaller than the second area, and the second area may exist within the first area and may be smaller than the first area.

According to an embodiment, the operation of receiving the service information may include an operation of outputting service information corresponding to movement between respective areas through the display.

According to an embodiment, the current location may be acquired by periodically detecting movement of the electronic device within the first area, the second area, or the third area.

According to an embodiment, the present disclosure may further include an operation of checking a remaining charge of a battery of the electronic device and an operation of, when the checked remaining charge of the battery is smaller than a predetermined value, not providing the received service information.

Figure 7:
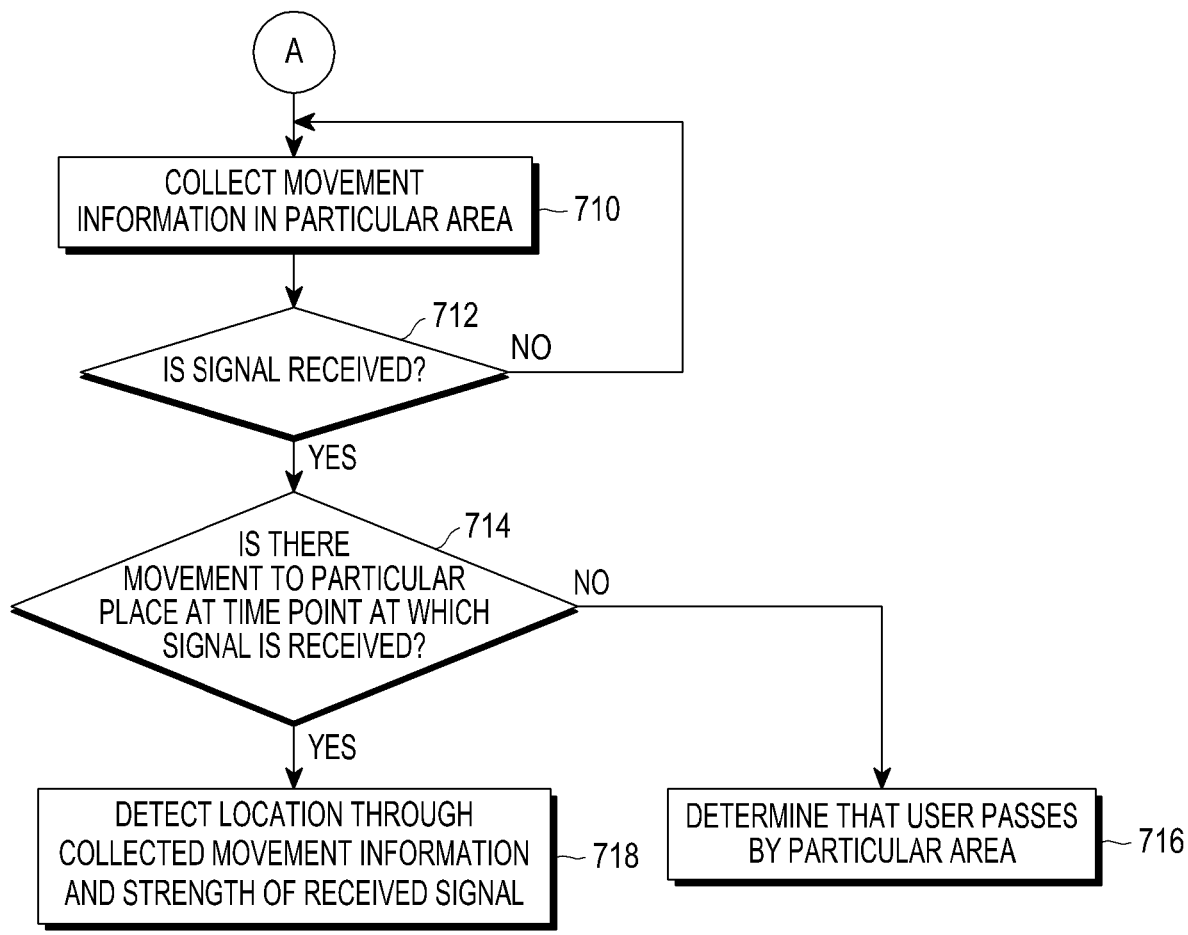
FIG. 7 is a flowchart illustrating a process of detecting the location of another electronic device according to various embodiments of the present disclosure.

FIG. 7 is a flowchart illustrating a process of detecting a location of another electronic device according to various embodiments of the present disclosure.

Hereinafter, the process of detecting the location of another electronic device according to various embodiments of the present disclosure will be described in detail with reference to FIG. 7.

According to various embodiments, the electronic device 101 may collect movement information in a particular area in step 710. The electronic device 101 (for example, the processor 120) may collect location information of the electronic device 101 changed by movement (for example, walking or running) before or after receiving identification information (for example, business information) from the transmitter 410. The electronic device 101 (for example, the processor 120) may collect movement information of the electronic device 101 before receiving or acquiring the identification information. In general, the user carrying the electronic device 101 may enter a particular place or a store that provides a service for business, in which case the electronic device 101 (for example, the processor 120) may collect walking information for a moving path through at least one sensor before receiving the identification information.

According to various embodiments, when receiving a signal from the transmitter 410 in step 712, the electronic device 101 (for example, the processor 120) may determine whether the electronic device 101 is moving to the particular place at the time point at which the signal is received in step 714. The transmitter 410 may broadcast identification information (for example, business information) to at least one electronic device existing in its own service area. Further, the transmitter 410 may broadcast a signal including its own identifier. The transmitter 410 may broadcast the identification information through any of various communication modules such as Bluetooth, Wi-Fi, and a wireless network, or may broadcast a signal (for example, a UUID) including its own identifier. The electronic device 101 (for example, the processor 120) may receive identification information or a signal transmitted from the transmitter 410. The electronic device 101 (for example, the processor 120) may determine whether movement to a place in which the transmitter 410 is located occurs at the time point at which the signal transmitted by the transmitter 410 is received. The electronic device 101 (for example, the processor 120) may determine a moving path, a movement distance, or a movement direction of the user through walking information collected until the time point at which the signal is received.

According to various embodiments, when the movement to the particular place is not performed in step 714, the electronic device 101 (for example, the processor 120) may determine that the user passes by the particular area in step 716. After receiving the signal, the electronic device 101 (for example, the processor 120) may determine the movement direction of the user by measuring the strength of the signal. When the strength of the signal gradually becomes weaker based on the result of the determination, the electronic device 101 (for example, the processor 120) may determine that the user moves in a direction farther from the particular area. After receiving the signal, the electronic device 101 (for example, the processor 120) may acquire various pieces of information on movement, such as whether the user walks, a walking state, a walking speed, and a step count through at least one sensor and perform various analyses on the movement through the acquired information.

According to various embodiments, when it is determined that movement to the particular place is performed in step 714, the electronic device 101 (for example, the processor 120) may detect the location of the electronic device 101 based on the collected movement information and the strength of the received signal in step 718. The electronic device 101 (for example, the processor 120) may determine whether the current location of the electronic device 101 is within a first area (for example, within 8 to 10 m) spaced apart from the transmitter 410 by a predetermined distance (for example, 8 m), whether the current location is within a second area (for example, within 3 to 8 m) spaced apart from the transmitter 410 by a predetermined distance (for example, 3 m), or whether the current location is within a third area (for example, within 3 m) spaced apart from the transmitter 410 by a predetermined distance (for example, 1 m) based at least on the identification information and the collected location information. The electronic device 101 (for example, the processor 120) may calculate a distance to the transmitter 410 by analyzing the strength of the received signal. Further, the electronic device 101 (for example, the processor 120) may perform calibration in order to accurately calculate the distance. As described above, when the distance is calculated through the strength of the signal, an error may be generated according to a surrounding environment. Accordingly, calibration is performed in order to calculate the distance more accurately. The electronic device 101 (for example, the processor 120) may determine the position at which the electronic device 101 is currently located within the particular area through the collected movement information, the strength of the received signal, or the calibration. As described above, when the location of the electronic device 101 is detected, the electronic device 101 (for example, the processor 120) may combine the detected location information and identification information and transmit the combined information to the server 420.

Figure 8:
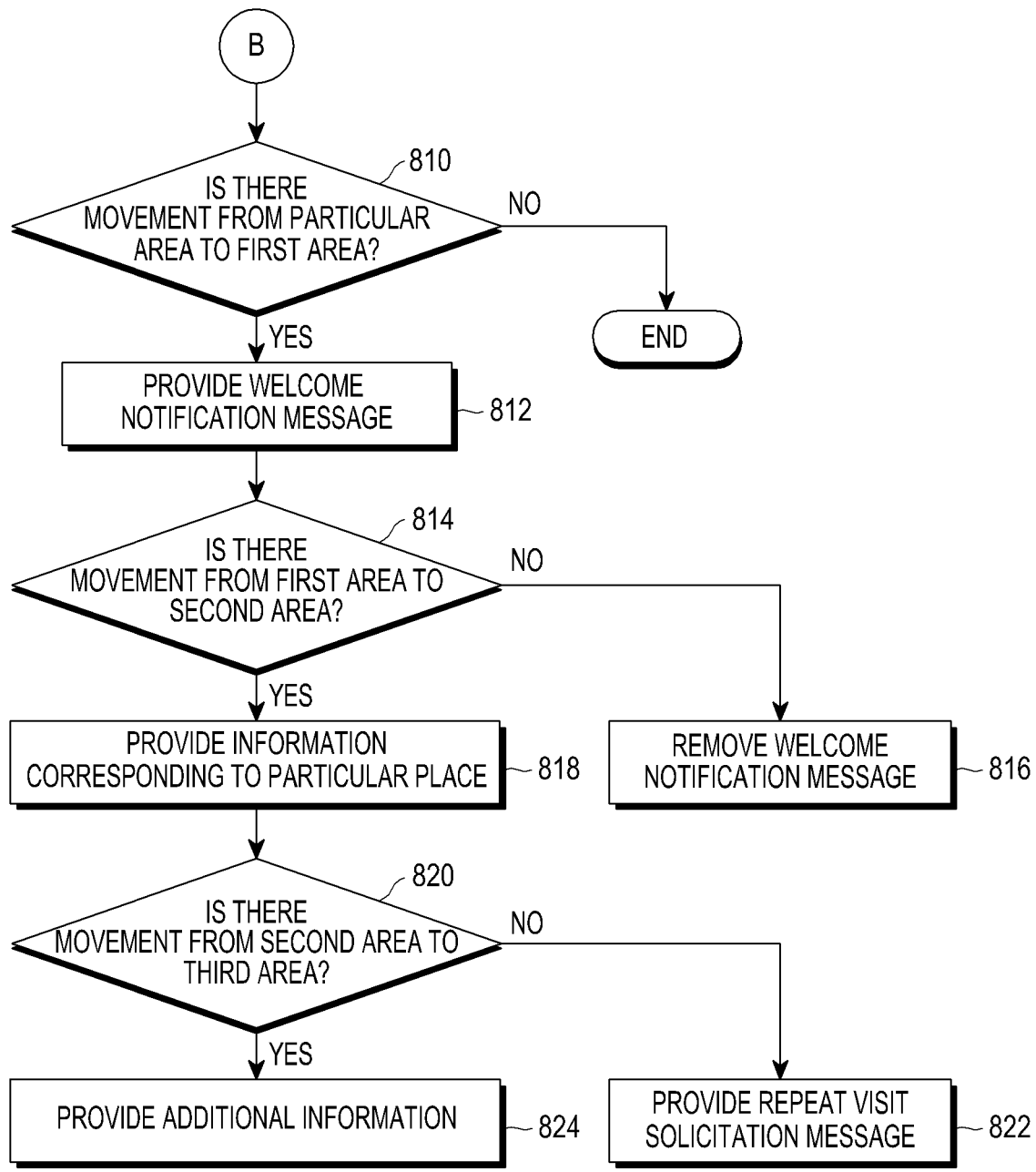
FIG. 8 is a flowchart illustrating a process in which the electronic device provides service information according to various embodiments of the present disclosure.

FIG. 8 is a flowchart illustrating a process in which the electronic device provides service information according to various embodiments of the present disclosure.

Hereinafter, a process in which another electronic device provides service information according to various embodiments of the present disclosure will be described in detail with reference to FIG. 8.

According to various embodiments, when movement from the particular area to the first area is performed in step 810, the electronic device 101 (for example, the processor 120) may provide a message in step 812. The electronic device 101 (for example, the processor 120) may determine whether the electronic device 101 exits the particular area through movement information collected in the particular area or is moving within the particular area. The electronic device 101 (for example, the processor 120) may collect movement information of the electronic device in the particular area for a predetermined time and determine a movement direction and a movement speed of the electronic device 101. When it is determined that the electronic device 101 stays in the particular area for a predetermined time, the electronic device 101 (for example, the processor 120) may generate a message and output the generated message through the display 160. Alternatively, the electronic device 101 (for example, the processor 120) may provide a welcome notification message to the user through a voice or vibration. The message may include various messages that welcome the entry of the user into the particular place. Further, the message may include a message related to a visit to the particular area (for example, a welcome notification message, information on products sold in the particular place, or discount information).

According to various embodiments, when movement from the first area to the second area is not performed in step 814, the electronic device 101 (for example, the processor 120) may remove the provided message in step 816. The electronic device 101 (for example, the processor 120) may calculate the time during which the electronic device 101 stays in the first area. When the electronic device 101 does not move to the second area within a predetermined time or exits the first area, the electronic device 101 (for example, the processor 120) may remove the provided message. Alternatively, the electronic device 101 (for example, the processor 120) may generate and output a notification message inducing another visit.

According to various embodiments, when movement from the first area to the second area is performed in step 814, the electronic device 101 (for example, the processor 120) may provide information corresponding to the particular place in step 818. The electronic device 101 (for example, the processor 120) may calculate the time during which the electronic device 101 stays in the first area. When the electronic device 101 moves to the second area within a predetermined time, the electronic device 101 (for example, the processor 120) may provide information corresponding to the particular place. Alternatively, the electronic device 101 (for example, the processor 120) may generate and output a notification message inducing another visit. The information may include information (for example, a price and a time) on various products (for example, a menu item and a category) provided in the particular place. Further, the information may include various pieces of information according to the business field of the shop or the type of service industry.

According to various embodiments, when movement from the second area to the third area is not performed in step 820, the electronic device 101 (for example, the processor 120) may provide a repeat visit solicitation message in step 822. The electronic device 101 (for example, the processor 120) may calculate a time during which the electronic device 101 stays in the second area. When the electronic device 101 does not move to the third area within a predetermined time or exits the second area, the electronic device 101 (for example, the processor 120) may generate and output a message suggesting another visit. Alternatively, when the electronic device 101 does not move to the third area within a predetermined time or exits the second area, the electronic device 101 (for example, the processor 120) may determine that the user has an intention to purchase products sold in the particular place and generate and output a notification message suggesting another visit.

According to various embodiments, when movement from the second area to the third area is performed in step 820, the electronic device 101 (for example, the processor 120) may provide additional information in step 824. The electronic device 101 (for example, the processor 120) may calculate a time during which the electronic device 101 stays in the second area. When the electronic device 101 moves to the third area within a predetermined time, the electronic device 101 (for example, the processor 120) may provide additional information provided in a particular place or a coupon notification. Further, when it is determined that the electronic device stays in the third area for a predetermined time or longer, the electronic device 101 (for example, the processor 120) may determine that the user purchases products sold in the particular area and provide additional information. The additional information may include, for example, various pieces of information such as a membership card, a discount card, coupons, and events in order to reduce user's costs or information on a wide range of benefits that can be provided to the user. Further, the additional information may include various pieces of information depending on the business field of the shop or the type of service industry.

Figure 9:
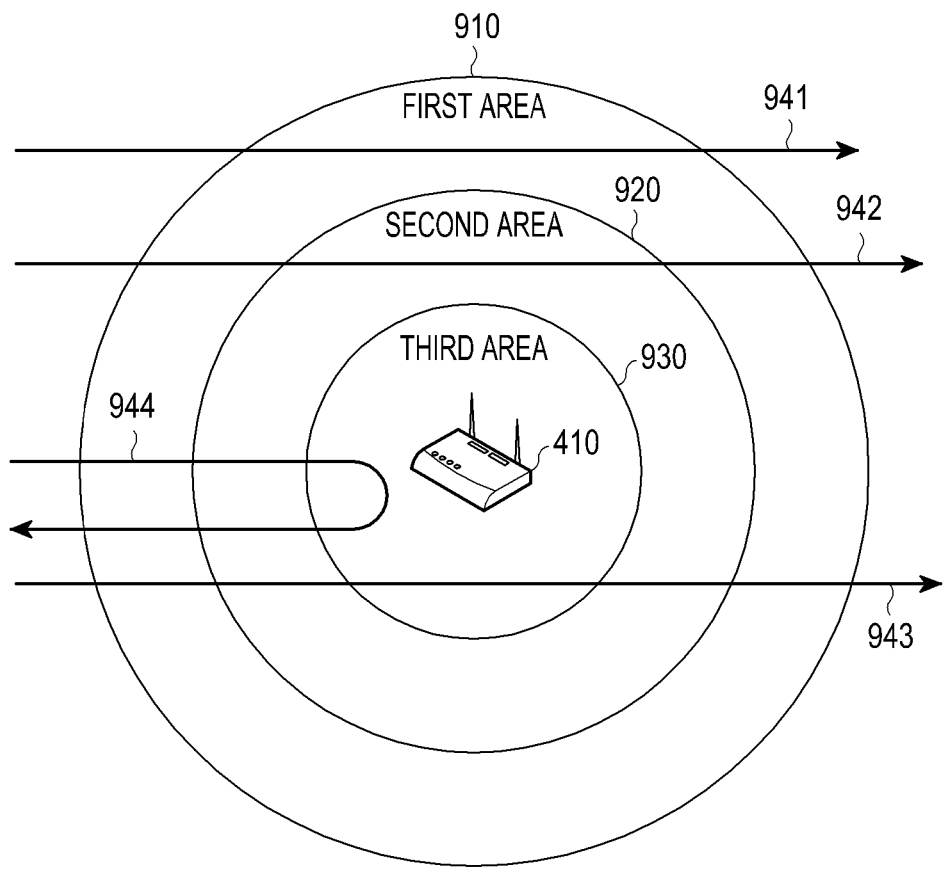
FIG. 9 illustrates a moving path of the electronic device according to various embodiments of the present disclosure.

FIG. 9 illustrates a moving path of the electronic device according to various embodiments of the present disclosure.

Referring to FIG. 9, a particular area in which service information is provided may be divided into a first area 910, a second area 920, and a third area 930 based on the transmitter 410.

According to various embodiments, the electronic device 101 (for example, the processor 120) may determine whether the current location of the electronic device 101 is within the first area 910, spaced apart from the transmitter 410 by a predetermined distance, within the second area 920, spaced apart from the transmitter 410 by a predetermined distance, or within the third area 930, spaced apart from the transmitter 410 by a predetermined distance, based at least on identification information (for example, business information) and collected location information. Further, the electronic device 101 (for example, the processor 120) may determine whether the electronic device 101 enters the first area 910 and then exits the first area 910 based at least on the identification information and the collected location information as indicated by reference numeral 941. This case may include the case in which the user passes by the vicinity of a particular area. When the electronic device 101 enters the first area 910, the electronic device 101 (for example, the processor 120) may provide a message. When it is determined that the electronic device 101 stays in the first area 910 for a predetermined time, the electronic device 101 (for example, the processor 120) may generate a message and output the generated message through the display 160. The electronic device 101 may output the message through various methods such as a voice, vibration, and a popup to allow the user to recognize the message. When the electronic device 101 does not move from the first area 910 to the second area 920 in step 814, the electronic device 101 (for example, the processor 120) may remove the provided message (for example, in the case of the popup).

According to various embodiments, after entering the first area 910 and the second area 920, the electronic device 101 (for example, the processor 120) may determine whether the electronic device exits the second area 920 and the first area 910, as indicated by reference numeral 942. This case may include the case in which the user enters a particular area but exits the particular area after a short stay. For example, the case may correspond to the case in which the user enters a shop to purchase a product but leaves the shop without making a purchase. When the electronic device 101 enters the second area 920, the electronic device 101 (for example, the processor 120) may provide information corresponding to the particular place. When it is determined that the electronic device 101 stays in the second area 910 for a predetermined time, the electronic device 101 (for example, the processor 120) may generate information corresponding to the particular place and output the generated information through the display 160. Information corresponding to the particular place may include information (for example, a price and a time) on various products (for example, a menu item and a category) provided in the particular place. Further, the information may include various pieces of information according to the business field of the shop or the type of service industry. The electronic device 101 may output the information through various methods such as a voice, vibration, and a popup to allow the user to recognize the information.

According to various embodiments, after entering the first area 910, the second area 920, and the third area 930, the electronic device 101 (for example, the processor 120) may determine whether the electronic device exits the third area 930, the second area 920, and the first area 910, as indicated by reference numeral 943. This case may correspond to the case in which, for example, the user of the electronic device 101 (for example, the processor 120) enters a shop and purchases a product or makes an inquiry to a seller. When the electronic device 101 enters the third area 930, the electronic device 101 (for example, the processor 120) may provide additional information. When it is determined that the electronic device 101 stays in the third area 910 for a predetermined time, the electronic device 101 (for example, the processor 120) may generate additional information corresponding to the particular area and output the generated additional information through the display 160. The additional information may include, for example, various pieces of information such as a membership card, a discount card, coupons, and events in order to reduce user's costs or information on a wide range of benefits that can be provided to the user. Further, the additional information may include various pieces of information according to the business field of the shop or the type of service industry. The electronic device 101 may provide notification of the output of the additional information through various methods such as a voice, vibration, and a popup to allow the user to recognize the additional information.

According to various embodiments, the electronic device 101 (for example, the processor 120) may determine whether the electronic device 101 exits the first area 910 after staying in the second area 920 or the third area 930 for a predetermined time or longer based at least on identification information and collected location information. For example, when the electronic device 101 stays in the second area 920 or the third area 930 for the predetermined time or longer, the electronic device 101 (for example, the processor 120) may determine that the user purchases a product in a shop or spends money, and may provide additional information. The additional information may include various pieces of information to reduce user costs or information on a wide range of benefits that can be provided to the user, such as a membership card, a discount card, coupons, and events. Alternatively, the additional information may include a thank-you message expressing gratitude for visiting and purchasing a product or a message indicating provision of an additional service in the case of a repeat visit.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may, for example, be the memory 360. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. According to various embodiments, a storage medium storing instructions is provided. The instructions may be configured to cause at least one processor to perform at least one operation when executed by the at least one processor. The instructions may include a first instruction set of acquiring a signal including one or more pieces of identification information corresponding to an external electronic device from the external electronic device through the communication module, a second instruction set of detecting movement of the electronic device through the sensor, a third instruction set of selecting first identification information among the one or more pieces of identification information when the movement meets a first condition, a fourth instruction set of selecting second identification information among the one or more pieces of identification information when the movement meets a second condition, and a fifth instruction set of providing service information corresponding to identification information selected among the first identification information and the second identification information. Further, the instructions may include a first instruction set of acquiring identification information corresponding to a place in which a first external electronic device is located from the first external electronic device located close to the electronic device, a second instruction set of transmitting the identification information and location information of the electronic device to the second external electronic device, and a third instruction set of receiving service information corresponding to the identification information from the second external electronic device.

Exemplary embodiments of the present disclosure shown and described in this specification and the drawings correspond to specific examples presented in order to easily describe technical contents of the present disclosure and to help comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device comprising:
   a communication module;
   a sensor; and
   a processor,
   wherein the processor is configured to:
      control to obtain movement information, including movement direction, of the electronic device, through the sensor;
      receive a signal including a plurality of pieces of identification information corresponding to a first external electronic device from the first external electronic device through the communication module;
      determine whether movement to a location of the first external electronic device is detected at a time point at which the signal is received; and
      based on determining that movement to the location of the first external electronic device is detected at the time point at which the signal is received:
         generate location information according to a location of the electronic device detected based on movement information obtained prior to receiving the signal and a strength of the received signal;
         select first identification information among the plurality of pieces of identification information based on direction of the movement of the electronic device indicated by the prior obtained movement information satisfying a first condition, and select second identification information among the plurality of pieces of identification information based on direction of the movement of the electronic device indicated by the prior obtained movement information satisfying a second condition; and
         provide service information corresponding to identification information selected among the first identification information and the second identification information and the generated location information, wherein the processor is configured to:
output first service information corresponding to a first area through a display based on the detected location being within the first area spaced apart from the first external electronic device by a first predetermined distance;
output second service information corresponding to a second area through the display based on the detected location being within a second area spaced apart from the first external electronic device by a second predetermined distance; and
output service information corresponding to a third area through the display based on the detected location being within a third area spaced apart from the first external electronic device by a third predetermined distance, and
wherein the third area is contained within the second area and is smaller than the second area, and the second area is contained within the first area and is smaller than the first area.

2. The electronic device of claim 1, wherein the processor is configured to:
obtain information regarding a distance to the first external electronic device based at least on the received signal, and wherein
determining of satisfying the first condition or the second condition is further based on the obtained distance information.

3. The electronic device of claim 2, wherein the processor is configured to perform calibration for obtaining the distance information based at least on the movement information.

4. The electronic device of claim 1, further comprising a display, wherein the processor is configured to control the display to display the first service information or the second service information.

5. The electronic device of claim 4, wherein the processor is configured to switch from providing the first service information to providing the second service information based on determining that the direction of the movement satisfies the second condition.

6. An electronic device comprising:
a first communication module;
a second communication module;
a memory; and
a processor,
wherein the processor is configured to:
control to obtain movement information, including movement direction, of the electronic device;
receive a signal including identification information corresponding to a location in which a first external electronic device is located from the first external electronic device through the first communication module;
determine whether movement to the location of the first external electronic device is detected at a time point at which the signal is received; and
based on determining that movement to the location of first external electronic device is detected at the time point at which the signal is received:
generate location information according to a location of the electronic device detected based on movement information obtained prior to receiving the signal and a strength of the received signal;
select first identification information included in the identification information based on direction of the movement of the electronic device indicated by the prior obtained movement information satisfying a first condition, and select second identification information included in the identification information based on direction of the movement of the electronic device indicated by the prior obtained movement information satisfying a second condition;
transmit the selected identification information and the generated location information to a second external electronic device through the second communication module;
receive service information corresponding to the selected identification information and the generated location information from the second external electronic device through the second communication module; and
provide the received service information,
wherein the processor is configured to:
output first service information corresponding to a first area through a display based on the detected location being within the first area spaced apart from the first external electronic device by a first predetermined distance;
output second service information corresponding to a second area through the display based on the detected location being within a second area spaced apart from the first external electronic device by a second predetermined distance; and
output service information corresponding to a third area through the display based on the detected location being within a third area spaced apart from the first external electronic device by a third predetermined distance,
wherein the third area is contained within the second area and is smaller than the second area, and the second area is contained within the first area and is smaller than the first area.

7. The electronic device of claim 6, further comprising a sensor, wherein the processor is configured to obtain the movement information through the sensor.

8. The electronic device of claim 7, wherein the identification information includes a predetermined business type or a predetermined shop name related to the electronic device.

9. The electronic device of claim 6, wherein the processor is configured to:
acquire location information by periodically detecting movement of the electronic device within the first area, the second area, or the third area;
transmit the acquired location information and the identification information acquired from the signal to the second external electronic device through the second communication module;
receive service information corresponding to the detected movement from the second external electronic device; and
display the received service information through the display.

10. The electronic device of claim 6, wherein the first service information includes a welcome notification message indicating a visit to the location, the second service information includes information corresponding to the location, and the third service information includes additional information provided in the location.

11. The electronic device of claim 6, wherein the processor is configured to:

check a remaining charge of a battery of the electronic device and based on the remaining charge of the battery being determined to be smaller than a predetermined value, control to not output the received service information.

12. A method of providing service information by an electronic device, the method comprising:

obtaining movement information, including movement direction, of the electronic device;

receiving a signal including identification information corresponding to a location in which a first external electronic device is located from the first external electronic device;

determining whether movement to the location of the first external electronic device is detected at a time point at which the signal is received; and based on determining that movement to the location of first external electronic device is detected at the time point at which the signal is received:

generating location information according to a location of the electronic device detected based on the movement information obtained prior to receiving the signal and a strength of the received signal;

select first identification information included in the identification information based on direction of the movement of the electronic device indicated by the prior obtained movement information satisfying a first condition, and select second identification information included in the identification information based on direction of the movement of the electronic device indicated by the prior obtained movement information satisfying a second condition;

transmitting the selected identification information and the generated location information to a second external electronic device;

receiving service information corresponding to the selected identification information and the generated location information from the second external electronic device; and providing the received service information, wherein the providing the received service information comprises:

outputting first service information corresponding to a first area through a display based on the detected location being within the first area spaced apart from the first external electronic device by a first predetermined distance;

outputting second service information corresponding to a second area through the display based on the detected location being within a second area spaced apart from the first external electronic device by a second predetermined distance; and outputting service information corresponding to a third area through the display based on the detected location being within a third area spaced apart from the first external electronic device by a third predetermined distance, and wherein the third area is contained within the second area and is smaller than the second area, and the second area is contained within the first area and is smaller than the first area.

13. The method of claim 12, further comprising obtaining the location information through at least one sensor included in the electronic device.

* * * * *